(12) United States Patent
Kim et al.

(10) Patent No.: US 8,295,608 B2
(45) Date of Patent: Oct. 23, 2012

(54) DEVICE AND METHOD FOR DETECTING THE JOINTED PARTS OF STRIP IN AN ENDLESS HOT ROLLING PROCESS

(75) Inventors: Yong Soo Kim, Kyungsangbook-do (KR); Jong Il Park, Kyungsangbook-do (KR); Oh Dae Kim, Kyungsangbook-do (KR); Yun Hyeon Kim, Kyungsangbook-do (KR); Myoung Koo Kang, Kyungsangbook-do (KR); Jin Su Bae, Kyungsangbook-do (KR)

(73) Assignee: POSCO, Pohang (KR)

( * ) Notice: Subject to any disclaimer, the term of this patent is extended or adjusted under 35 U.S.C. 154(b) by 268 days.

(21) Appl. No.: 12/745,293

(22) PCT Filed: Nov. 25, 2008

(86) PCT No.: PCT/KR2008/006935
§ 371 (c)(1),
(2), (4) Date: Aug. 16, 2010

(87) PCT Pub. No.: WO2009/069924
PCT Pub. Date: Jun. 4, 2009

(65) Prior Publication Data
US 2010/0310149 A1    Dec. 9, 2010

(30) Foreign Application Priority Data
Nov. 29, 2007  (KR) .......................... 10-2007-0122786

(51) Int. Cl.
*G06K 9/48* (2006.01)
(52) U.S. Cl. ..................................................... 382/199
(58) Field of Classification Search .................. 382/100, 382/141, 149, 151, 152, 153; 348/86, 88, 348/90, 92, 94, 95, 125, 128; 356/237.2, 356/430, 431; 228/158; 83/13, 27, 73, 75; 72/203, 365.2; 250/559.36
See application file for complete search history.

(56) References Cited

U.S. PATENT DOCUMENTS
4,499,383 A * 2/1985 Loose ..................... 250/559.36
(Continued)

FOREIGN PATENT DOCUMENTS
JP   2000233220 A   8/2000
KR   100231980 B1   12/1999
(Continued)

*Primary Examiner* — Jose Couso
(74) *Attorney, Agent, or Firm* — The Webb Law Firm

(57) ABSTRACT

There are provided a device and method for detecting joint parts of a steel strip in an endless hot rolling process. The device for detecting joint parts of a steel strip in an endless hot rolling process includes an image signal collection block receiving image signals, each having information on gray level pixels of a steel strip, from a charge coupled device (CCD) camera; an edge line detection block receiving the image signals from the image signal collection block to detect an edge line of the steel strip; a profile calculation block receiving information on the detection of the edge line from the edge line detection block to calculate the sum of gray levels up to an edge line of the steel strip in a traverse direction of the steel strip when the edge line is detected by the edge line detection block; a joint part judgement block receiving information on the sum of the gray levels, which shows a current profile value, from the profile calculation block to judge the edge line as a joint part when a ratio of a mean value of the current profile and a mean value of the previous profile is less than a predetermined value; and an output block receiving information on the judgement of the edge line as the joint part from the joint part judgement block to output a joint part-detecting signal when the edge line is judged to be a joint part.

10 Claims, 5 Drawing Sheets

U.S. PATENT DOCUMENTS

| | | | |
|---|---|---|---|
| 5,560,236 A | | 10/1996 | Onda et al. |
| 6,085,624 A | * | 7/2000 | Lever et al. .................. 83/13 |
| 7,248,366 B2 | * | 7/2007 | Uesugi et al. ............. 356/431 |
| 8,127,826 B2 | * | 3/2012 | Hohenbichler et al. ...... 164/455 |

FOREIGN PATENT DOCUMENTS

| | | |
|---|---|---|
| KR | 1020010112578 A | 12/2001 |
| KR | 20020052867 A | 7/2002 |
| KR | 100543258 B1 | 3/2005 |

\* cited by examiner

[Figure 1]
Prior Art
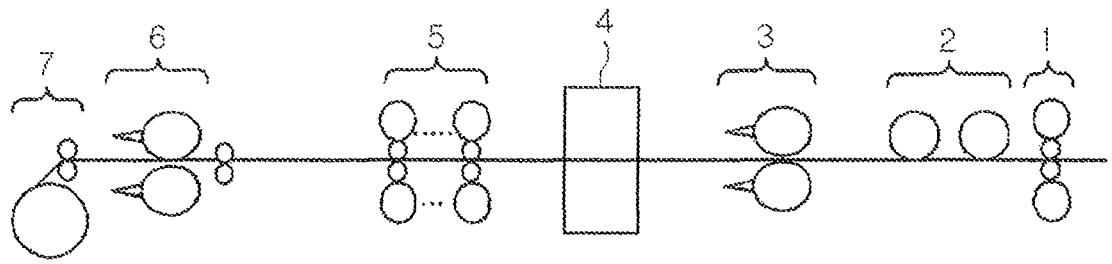
[Figure 2]
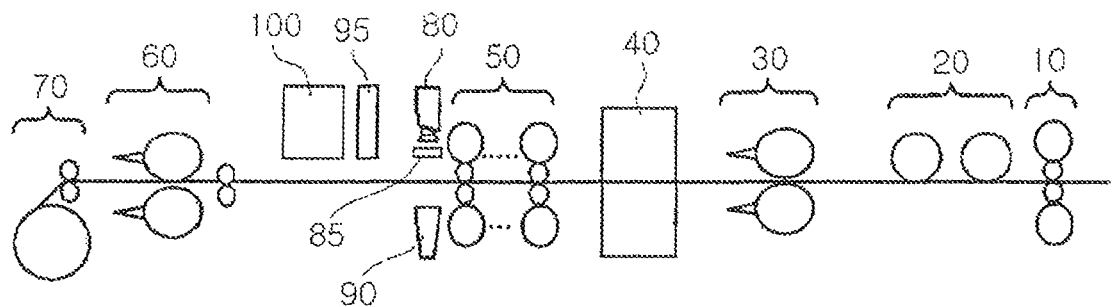
[Figure 3]
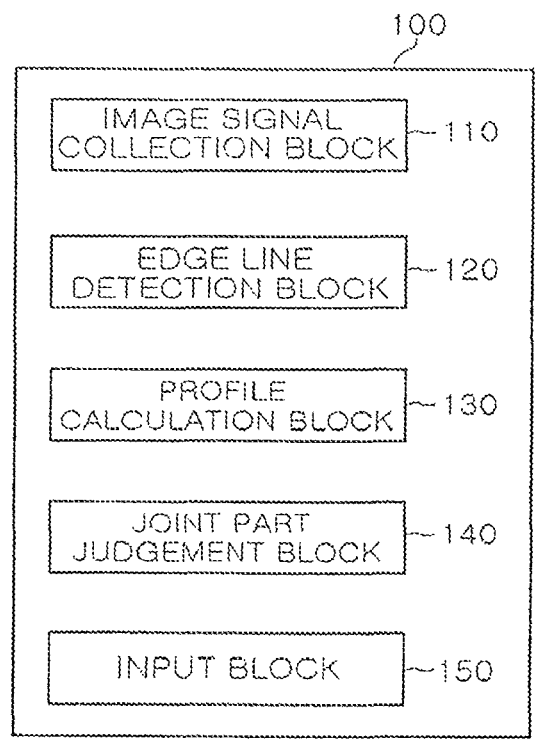

【Figure 4】
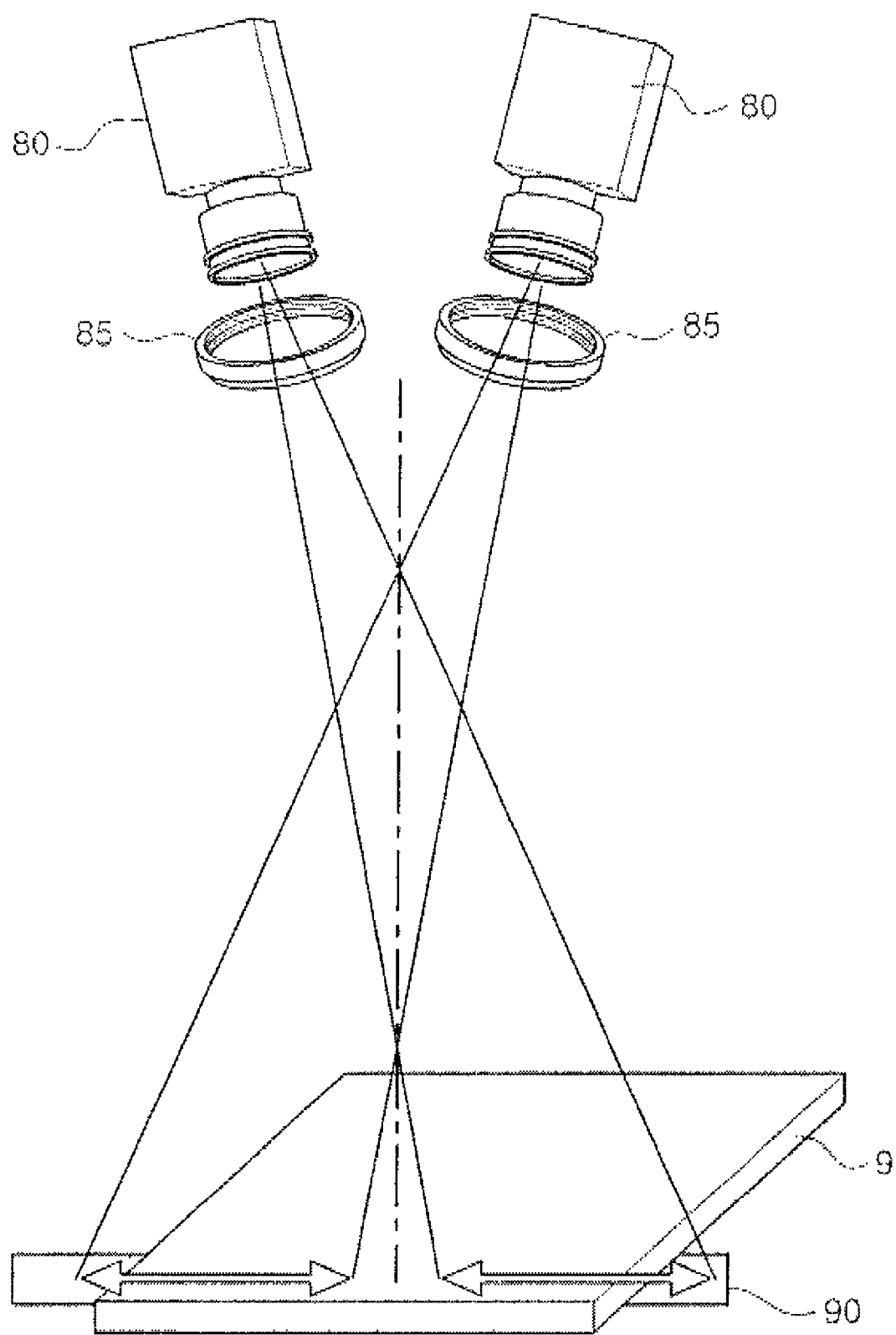

[Figure 5]
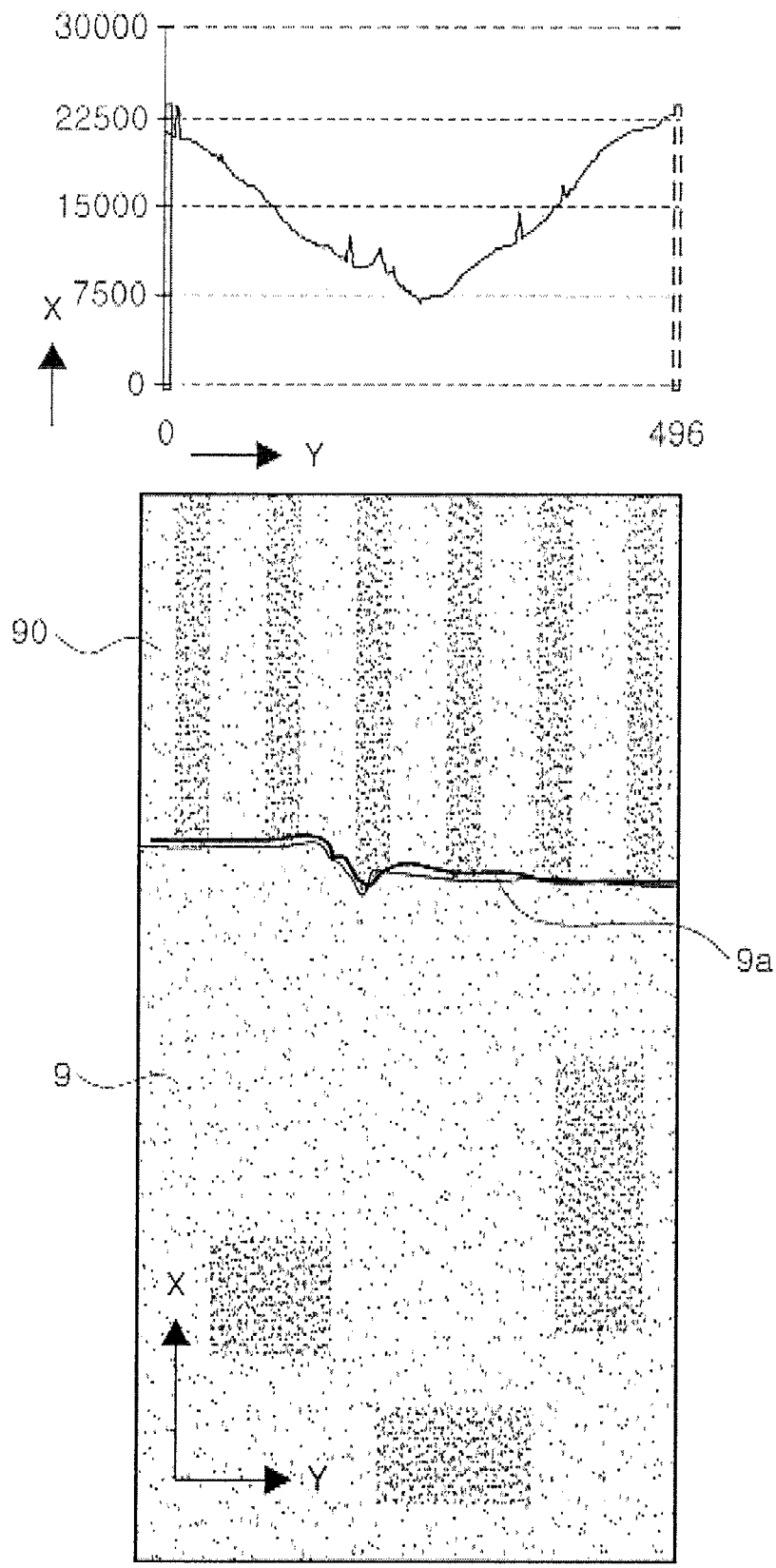

[Figure 6]
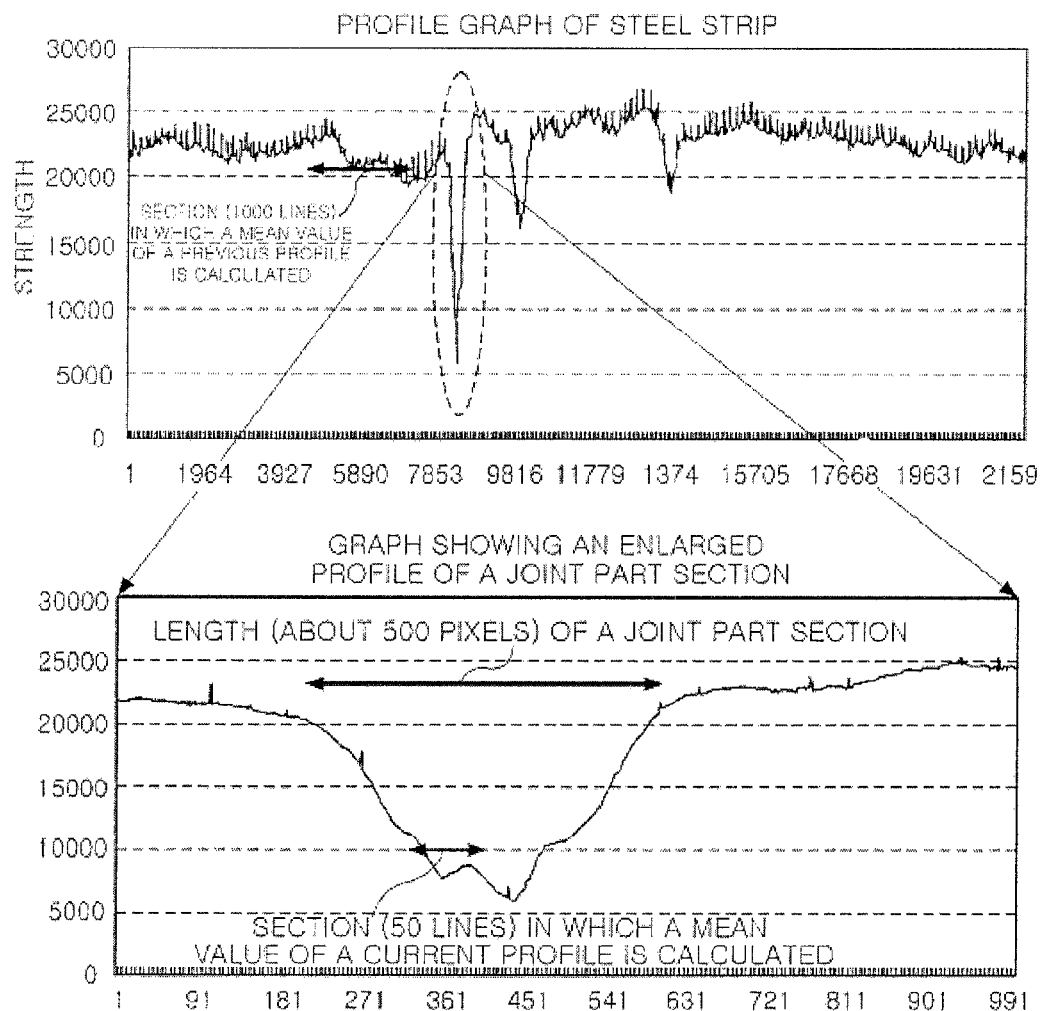
[Figure 7]
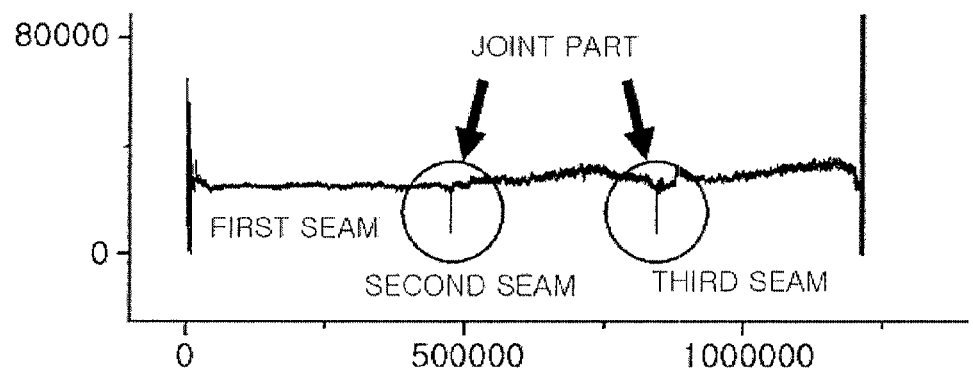

[Figure 8]
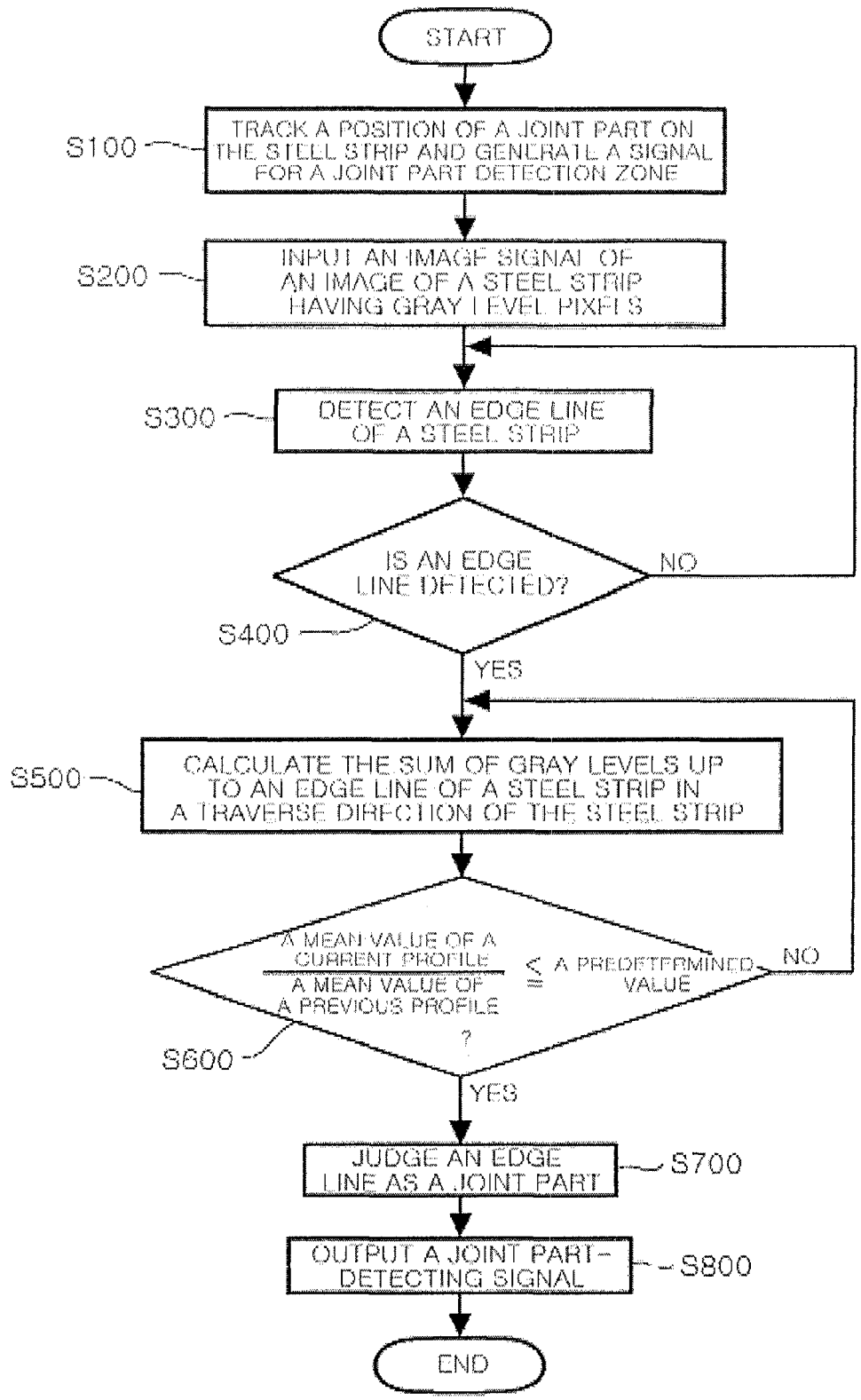

DEVICE AND METHOD FOR DETECTING THE JOINTED PARTS OF STRIP IN AN ENDLESS HOT ROLLING PROCESS

TECHNICAL FIELD

The present invention relates to a device and method for detecting joint parts of a steel strip in an endless hot rolling process, and more particularly, to a device and method for accurately detecting joint parts of a steel strip in an endless hot rolling process.

BACKGROUND ART

An endless hot rolling process has an advantage in that the manufacturing time may be significantly shortened, for example, by rolling a steel sheet within one second. Therefore, it is expected that the endless hot rolling process is used to increase productivity and improve product quality of steel sheet, as well as to prevent a variety of facility accidents, compared to the conventional rolling processes of standing by for a tens-second period from when one hot rolling material is rolled in a roughing mill to when the next one is rolled in a roughing mill. Also, the endless hot rolling process has advantages in that inferior front and rear ends of a coil and scrap loss may be reduced during the coiling process, and it is possible to produce a steel sheet having such width and thickness that it is difficult to roll a steel sheet in general hot rolling mill plants.

FIG. 1 is a configuration view illustrating a conventional endless hot rolling mill facility. Referring to FIG. 1, a hot rolling material rolled in a roughing mill 1 is coiled in a coil box 2, and a coil was cut between the rear end of a preceding coil material and the front end of a following coil material using a crop cutter 3, the preceding and following coil materials being drawn out from the coil box 2. Then, the drawing of the following coil material was accelerated so that the front end of the following coil material can be overlapped with the rear end of the preceding coil material, and the overlapped regions are joined with a joining machine 4. Then, the joined coil is finish-rolled in a finishing mill 5, and then cut with high-speed cutter 6 arranged in the front of the coiling machine 7, thus to produce a final product.

When the joint parts are cut with the high-speed cutter 6 of the endless hot rolling mill facility, it is important to secure exact tracking of joint parts and reduce errors in cutting length (a distance between a joint part and a cutting point), which leads to an increase in an actual yield of the final product. Therefore, there have been continuous demands for a technology of detecting junctions in an endless rolling material.

As the conventional methods of detecting junctions in an endless rolling material, there are known methods, such as a method including: producing a junction in an rolling material by joining overlapped region of the rolling material and tracking the corresponding junctions by using the rolling speed and the difference in thicknesses of a steel strip measured in an input and an output of the finishing mill (Korean Patent No. 0231980), a method for detecting a joint part including: detecting a joint part of a preceding coil material and a following coil material using the change in load of the rolling material or the change in a thickness direction (Korean Patent No. 0543258), etc.

In the case of these methods, a position of the joint part is determined by calculating a sheet pressure and a strand roll speed of a strand in the output of the finishing mill. Even when a joint part is exactly detected from a strand (for example, a first or second strand) arranged in an upper region of the joining machine 4 or the finishing mill 5 whose roll force is changed, a position of the joint part is determined by calculating a sheet pressure and a strand roll speed of the strand arranged in a lower region of the finishing mill 5 (for example, third to eighth stands). Therefore, errors in the position of the joint part are found from the final stand in the output of the finishing mill 5.

Also, there is a method of determining a joint part using an out-of-line sheet width and a crack length of the endless joint part. However, this method has its limit to determine a joint part since the sheet width may not be out of line and cracks may not be generated when coil materials having the same width are exactly overlapped and joined each other, or there is a sufficient joint strength in an edge of the joint part.

SUMMARY OF THE INVENTION

The present invention is designed to solve the problems of the prior art, and therefore it is an object of the present invention to provide a device and method capable of exactly detecting joint parts between a preceding coil material and a following coil material of a steel strip by detecting an edge line of the steel strip in an endless hot rolling process.

According to an aspect of the present invention, there is provided a device for detecting joint parts of a steel strip in an endless hot rolling process. Here, the device includes an image signal collection block receiving image signals, each having information on gray level pixels of a steel strip, from a charge coupled device (CCD) camera; an edge line detection block receiving the image signals from the image signal collection block to detect an edge line of the steel strip; a profile calculation block receiving information on the detection of the edge line from the edge line detection block to calculate the sum of gray levels up to an edge line of the steel strip in a traverse direction of the steel strip when the edge line is detected by the edge line detection block; a joint part judgement block receiving information on the sum of the gray levels, which shows a current profile value, from the profile calculation block to judge the edge line as a joint part when a ratio of a mean value of the current profile and a mean value of the previous profile is less than a predetermined value; and an output block receiving information on the judgement of the edge line as the joint part from the joint part judgement block to output a joint part-detecting signal when the edge line is judged to be a joint part.

According to another aspect of the present invention, there is provided a method for detecting a joint part in an endless hot rolling process. Here, the method includes: receiving, at an image signal collection block, an image signal of an image of a steel strip from a CCD camera, the image having gray level pixels; receiving, at an edge line detection block, the image signal from the image signal collection block to detect an edge line on the steel strip; receiving, at a profile calculation block, information on the detection of the edge line from the edge line detection block to calculate the sum of the gray levels up to an edge line of the steel strip in a traverse direction of the steel strip when the edge line is detected by the edge line detection block; receiving, at a joint part judgement block, information on the sum of the gray levels, which shows a current profile value, from the profile calculation block to judge the edge line as a joint part when a ratio of a mean value of the current profile and a mean value of the previous profile is less than a predetermined value; and receiving, at an output block, information on the judgement of the edge line as the joint part from the joint part judgement block to output a joint part-detecting signal.

As described above, the device and method for detecting joint parts of a steel strip in an endless hot rolling process according to one exemplary embodiment of the present invention may be useful to quickly and exactly judge a joint part positioned between a preceding coil material and a following coil material of the steel strip without being affected by noises by tracking a position of the joint part between the preceding coil material and the following coil material of the steel strip to measure an image of the steel strip whose profile value is within an error range and using the sum of gray levels up to the edge line.

BRIEF DESCRIPTION OF THE DRAWINGS

FIG. 1 is a configuration view illustrating a conventional endless hot rolling mill facility;

FIG. 2 is a configuration view illustrating an endless hot rolling mill facility for detecting a joint part of a steel strip according to one exemplary embodiment of the present invention;

FIG. 3 is a block view illustrating a joint part detection system as shown in FIG. 2;

FIG. 4 is a state diagram illustrating that a CCD camera as shown in FIG. 2 receives an image signal from a light source;

FIG. 5 is a graph illustrating an image of a joint part and a profile value in a traverse direction in the steel strip according to one exemplary embodiment of the present invention;

FIG. 6 is a graph illustrating an operation of calculating a profile value of the steel strip according to one exemplary embodiment of the present invention;

FIG. 7 is a graph illustrating a length of the entire profile of 3 seams of the steel strips which are jointed and subjected to an endless hot rolling process according to one exemplary embodiment of the present invention; and FIG. 8 is a flow chart illustrating a method for detecting a joint part of a steel strip in an endless hot rolling process according to one exemplary embodiment of the present invention.

DETAILED DESCRIPTION OF THE INVENTION

Hereinafter, exemplary embodiments of the present invention will now be described in detail with reference to the accompanying drawings. However, it should be understood that other equivalents and modifications could be made thereto without departing from the spirit and scope of the invention. Also, it is considered that parts that have the similar or substantially identical functions and effects in the accompanying drawings have the same reference numerals.

FIG. 2 is a configuration view illustrating an endless hot rolling mill facility for detecting a joint part of a steel strip according to one exemplary embodiment of the present invention. Referring to FIG. 2, a hot rolling material rolled in a roughing mill 10 is coiled into a coil box 20, and a coil was cut between the rear end of a preceding coil material and the front end of a following coil material, both of which are drawn out from the coil box 20, by using a crop cutter 30. Then, the drawing of the following coil material was accelerated so that the front end of the following coil material can be overlapped with the rear end of the preceding coil material, and the overlapped regions are joined with a joining machine 40. Then, the joined coil is finish-rolled in a finishing mill 50, and then cut with high-speed cutter 60 arranged in the front of the coiling machine 77, thus to produce a final product.

The device for detecting a joint part on a steel strip in an endless hot rolling process according to one exemplary embodiment of the present invention includes a CCD camera 80, an optical filter 85, a light source 90, a tracking unit 95 and a joint part detection system 100.

The CCD camera 80 is installed in a final strand output of the finishing mill 50. However, since a coil temperature of the final strand output is varied according to the kinds of the steel strips, and it is difficult to detect an edge line since an edge of the coil is lower in temperature than the other region of the coil, the edge lines of the coil is detected with high detection frequency by installing a light source 90 in a lower portion of a work roll of the finishing mill 50.

The optical filter 85 is installed in a lower portion of the CCD camera 80 to transmit a wavelength of a light source, thus to display the light-transmitted region on the CCD camera 80 with an illuminance greater than or equal to a predetermined illuminance.

The tracking unit 95 tracks a position of the joint part on the steel strip to generate a signal for a joint part detection zone, and transmits the generated signal to the joint part detection system 100. When a temperature is dropped in a middle region of the steel strip by abnormal factors such as erroneous control of cooling water in the roughing, coil box, descaling and finish rolling processes, a gray level of an image is dark. Therefore, it is possible to misjudge an edge line as the joint part. In order to solve the above problems, the tracking unit 95 transmits a signal for the joint part detection zone to the joint part detection system 100. The tracking unit 95 essentially tracts a position of the joint part; but has some tracking errors. This tracking information is not exact, but may be used as information on a monitoring section for detecting a joint part in the joint part detection system 100. For example, when the maximum tracking error range that may be caused in the tracking unit 95 is 14 m, and a distance between strands on the finishing mill is 5 m, a joint part is tracked in a position of a third stand from the final stand. In this case, the tracking unit 95 turns on a joint part monitoring signal, and then turns off the joint part monitoring signal when it is judged that the joint part monitoring signal is passed through the CCD camera 80. Therefore, the tracking information of the tracking unit 95 may be employed as information on a detection zone of the joint part detection system 100.

The joint part detection system 100 detects a joint part on the steel strip. When the joint part on the steel strip is detected by the joint part detection system 100, the joint part is cut with a high-speed cutter 60. A drawing rate of the endless hot-rolled steel strip is approximately 10 to 20 m/s, and there is a delay time from when the high-speed cutter 60 cuts a coil to when it receives an operation preparation and a cutting instruction. Therefore, the joint part detection system 100 is positioned between the final stand of the finishing mill 50 and the high-speed cutter 60 in consideration of the above facts. The detailed configuration of the joint part detection system 100 is described in more detail with reference to FIG. 3.

FIG. 3 is a block view illustrating the joint part detection system as shown in FIG. 2. Referring to FIG. 3, the joint part detection system 100 includes an image signal collection block 110, an edge line detection block 120, a profile calculation block 130, a joint part judgement block 140 and an output block 150.

The image signal collection block 110 receives an image signal of an image of the steel strip from the CCD camera 80, the image having gray level pixels.

The edge line detection block 120 receives the image signal form the image signal collection block 110 to detect an edge line on the steel strip.

The profile calculation block 130 receives information on the detection of the edge line from the edge line detection block 120, and calculates the sum of gray levels up to the edge line of the steel strip in a traverse direction of the steel strip when the edge line is detected by the edge line detection block 120.

The joint part judgement block 140 receives information on the sum of the gray levels, which shows a current profile value, from the profile calculation block 130, and judges the edge line as a joint part when a ratio of a mean value of the current profile and a mean value of the previous profile is less than a predetermined value. The mean value of the current profile is a mean value of the current profiles including a current position of the edge line in a longitudinal direction, and preferably is a mean profile value of profiles as many as $\frac{1}{10}$ of the lines in a joint part section of an image in a longitudinal direction of the steel strip. Also, the mean value of the previous profile is referred to as a mean value of the previous profiles including the number of lines corresponding to a length of the joint part section in a longitudinal direction of the steel strip. A predetermined value, i.e. a ratio of the mean value of the current profile to the mean value of the previous profile for the judgement of the joint part is in a range of 0.5 to 0.7.

The output block 150 receives information on the judgement as the joint part from the joint part judgement block 140 and outputs a joint part detection signal when the edge line is judged to be a joint part.

FIG. 4 is a state diagram illustrating that a CCD camera as shown in FIG. 2 receives an image signal from a light source. Referring to FIG. 4, the light source 90 is installed in a lower portion of the finishing mill roll so as to improve the detection of the edge line on the steel strip 9, and an optical filter 85 is installed to intercept an infrared wavelength range by using gray levels of an image of the steel strip 9 to detect a joint part on the steel strip.

In general, the optical filter 85 transmitting only the wavelength range of the light source 90 is used to enhance the detection of the edge line, and therefore, the light source-transmitted region is brightly displayed on the CCD camera 80, and the steel strip 9 is darkly displayed on the CCD camera 80. Therefore, the light and shade are not distinguished from each other in a central region of the steel strip 9. The steel strip hot-rolled at 800° C. or above strongly emits light with an infrared wavelength range as well as a visible wavelength range, and the CCD camera 80 is also strongly sensitive to light with an infrared wavelength range. Therefore, when the optical filter 85 that may intercept the infrared wavelength range is used, the light source 90 is transmitted through the CCD camera 80 to distinguish the edge line of the steel strip 9, and also to obtain an image whose light and shade are distinguished in a surface of the steel strip 9.

FIG. 5 is a graph illustrating an image of a joint part and a profile value in a traverse direction in the steel strip according to one exemplary embodiment of the present invention. Referring to FIG. 5, the profile value in a traverse direction of the steel strip 9 is the sum of gray levels of the image of the steel strip 9 up to an edge line (9a) in a traverse direction of the steel strip 9. Therefore, a profile 'y' may be represented by the following Equation 1 as a profile value in a traverse direction at a position y in a longitudinal direction of the steel strip.

$$\text{Profile}(y) = \sum_{x=0}^{\text{Edge line}} \text{Pixel}(x, y) \quad \text{Equation 1}$$

Since the joint part whose preceding and following coil materials are overlapped with each other in the endless hot rolling process and joined to each other in a super deformation shear joining method has a lower thickness than the other regions, the gray levels of the image gets darker as the temperature decreases during the finishing mill process. In accordance with the present invention, since the joint part of the steel strip is shown more darkly than the other regions of the steel strip, the entire joint part has a lower gray level in a traverse direction. With reference to this characteristic of the steel strip, the stun of the gray levels in a traverse direction of the steel strip 9 other than the gray levels of pixels in some region of the steel strip 9 is used to detect a joint part of the steel strip 9, thereby getting rid of the effect of noises in a traverse direction or stains of the steel strip 9.

In order to judge the joint part on the corresponding steel strip 9, the mean value of the current profile of the steel strip 9 is compared to the mean value of the previous profile of the steel strip 9.

FIG. 6 is a graph illustrating an operation of calculating a profile value of the steel strip according to one exemplary embodiment of the present invention. Referring to FIG. 6, an upper graph shows a mean profile value of the steel strip, and a lower graph shows an enlarged joint part section of the steel strip.

Since a length of a joint part section having a decreased profile value is less than 500 lines in an image, a mean value of the current profile of the steel strip is an mean profile value of 50 lines including a current line 'y' in comparison, and a mean value of the previous profile of the steel strip as a standard of comparison is a mean profile value of 1000 lines prior to the 500 lines from the current line 'y'. Preferably, the mean value of the previous profile of the steel strip as a standard of comparison is a profile mean value of lines that is twice than a length of the joint part section prior to the lines corresponding to the length of the joint part section from the current line 'y,' and the mean value of the current profile is a mean value of profiles corresponding to a tenth of the length of the joint part section including the current line 'y.'

Since it takes a lot of time to calculate a mean profile value of the entire steel strip, a mean profile value of 1000 edge lines of the steel strip stands for a mean profile value of the entire steel strip. And, since a mean profile value of the steel strip is reduced around the joint part section to affect the mean profile value of the entire steel strip, a mean profile value of the 1000 edge line prior to 500 edge lines from the current edge line is calculated.

The mean value of the previous profile may be represented by the following Equation 2, wherein the mean value of the previous profile stands for the mean profile value of the entire steel strip in a position 'y' of a longitudinal direction.

$$\text{Profile}(\overline{y}) = \sum_{y=-500}^{-1499} \frac{\text{Profile}(y)}{1000} \quad \text{Equation 2}$$

In order to judge the joint part, a profile mean value of 50 former lines including a current line to remove an effect of the fluctuations of some profiles by noises in a traverse direction on the detection of the joint part is calculated as a mean value of the current profile, and compared with a mean value of the previous profile. Preferably, the mean value of the current profile is a mean value of profiles corresponding to a tenth of the length of the joint part section including the current line.

Since the profile value of the steel strip in a traverse direction is varied by a width and temperature of an adhesive, the edge line is judged as the joint part when a ratio of the mean value of the current profile to the mean value of the previous profile of the steel strip is less than a predetermined value. For example, the predetermined value is in a range of 0.5 to 0.7.

FIG. 7 is a graph illustrating a length of the entire profile of 3 seams of the steel strips which are jointed and subjected to an endless hot rolling process according to one exemplary embodiment of the present invention. Referring to FIG. 7, when the 3 seams of the steel strip is subject to the endless hot rolling process, it might be seen that two joint parts are generated on the steel strip, and a position at which a profile value is decreased is a joint part.

FIG. 8 is a flow chart illustrating a method for detecting a joint part of a steel strip in an endless hot rolling process according to one exemplary embodiment of the present invention. Referring to FIG. 8 along with FIGS. 2 and 3, the method for detecting a joint part of a steel strip in an endless hot rolling process is described, as follows.

First, the tracking unit 95 tracks a position of a joint part on a steel strip to generate a signal for a joint part detection zone, and transmits the generated signal to the edge line detection block 120 (S100). When a temperature is dropped in a middle region of the steel strip by abnormal factors such as erroneous control of cooling water in the roughing, coil box, descaling and finish rolling processes, and thus a gray level of an image is dark, it is possible to misjudge an edge line as the joint part. In order to solve the above problems, the tracking unit 95 transmits a signal for the joint part detection zone to the joint part detection system 100.

Next, the image signal collection block 110 receives an image signal of an image of the steel strip from the CCD camera 80, the image having gray level pixels (S200).

Then, the edge line detection block 120 receives the image signal from the image signal collection block 110 to detect an edge line on the steel strip (S300).

Subsequently, the profile calculation block 130 receives information on the detection of the edge line from the edge line detection block 120 to judge whether the edge line is detected by the edge line detection block 120 (S400). After the profile calculation block 130 judges whether the edge line is detected by the edge line detection block 120 (S400), the profile calculation block 130 calculates the stun of gray levels up to an edge line of the steel strip in a traverse direction of the steel strip (S500) when the edge line is detected by the edge line detection block 130.

Then, the joint part judgement block 140 receives information on the sum of the gray levels, which shows a current profile value, from the profile calculation block 130 to judge whether a ratio of a mean value of the current profile and a mean value of the previous profile is less than a predetermined value (S600). The joint part judgement block 140 judges the edge line as the joint part when the ratio of the mean value of the current profile and the mean value of the previous profile is less than a predetermined value (S700).

Finally, the output block 150 receives information on the judgement of the edge line as the joint part from the joint part judgement block 140 to output a joint part-detecting signal (S800).

As described above, the exemplary embodiments of the present invention have been described in detail referring to the accompanying drawings. However, the description proposed herein is just a preferable example for the purpose of illustrations only, not intended to limit the scope of the invention, so it should be understood that other equivalents and modifications could be made thereto without departing from the spirit and scope of the invention, as apparent to those skilled in the art.

The invention claimed is:

1. A device for detecting joint parts of a steel strip in an endless hot rolling process, comprising:
   an image signal collection block receiving image signals, each having information on gray level pixels of a steel strip, from a charge coupled device (CCD) camera;
   an edge line detection block receiving the image signals from the image signal collection block to detect an edge line of the steel strip;
   a profile calculation block receiving information on the detection of the edge line from the edge line detection block to calculate the sum of gray levels up to an edge line of the steel strip in a traverse direction of the steel strip when the edge line is detected by the edge line detection block;
   a joint part judgement block receiving information on the sum of the gray levels, which shows a current profile value, from the profile calculation block to judge the edge line as a joint part when a ratio of a mean value of the current profile and a mean value of the previous profile is less than a predetermined value; and
   an output block receiving information on the judgement of the edge line as the joint part from the joint part judgement block to output a joint part-detecting signal when the edge line is judged to be a joint part.

2. The device of claim 1, further comprising a tracking unit tracking a position of the joint part on the steel strip to generate a signal for a joint part detection zone and transmitting the generated signal to the edge line detection block.

3. The device of claim 1, further comprising an optical filter transmitting a wavelength of a light source and displaying the light-transmitted region on the CCD camera with an illuminance greater than or equal to a predetermined illuminance.

4. The device of claim 1, wherein the mean value of the current profile is a mean profile value of the number of lines including current lines, the lines corresponding to a length of a joint part section in a longitudinal direction of the steel strip.

5. The device of claim 1, wherein the mean value of the previous profile is a mean profile value of the number of lines which correspond to two times the length of the joint part section among the lines prior to the joint part section.

6. The device of claim 1, wherein the predetermined value is in a range of 0.5 to 0.7.

7. A method for detecting a joint part in an endless hot rolling process, the method comprising:
   receiving, at an image signal collection block, an image signal of an image of a steel strip from a CCD camera, the image having gray level pixels;
   receiving, at an edge line detection block, the image signal from the image signal collection block to detect an edge line on the steel strip;
   receiving, at a profile calculation block, information on the detection of the edge line from the edge line detection block to calculate the sum of the gray levels up to an edge line of the steel strip in a traverse direction of the steel strip when the edge line is detected by the edge line detection block;
   receiving, at a joint part judgement block, information on the sum of the gray levels, which shows a current profile value, from the profile calculation block to judge the edge line as a joint part when a ratio of a mean value of the current profile and a mean value of the previous profile is less than a predetermined value; and receiving, at an output block, information on the judgement of the edge line as the joint part from the joint part judgement, block to output a joint part-detecting signal.

8. The method of claim 7, further comprising, prior to the operation of receiving an image signal of an image of a steel strip from a CCD camera:

tracking a position of a joint part on the steel strip at a tracking unit;

generating a signal for a joint part detection zone; and transmitting the generated signal to the image signal collection block.

9. The device of claim 5, wherein the predetermined value is in a range of 0.5 to 0.7.

10. The method of claim 7, wherein the predetermined value is in a range of 0.5 to 0.7.

* * * * *

UNITED STATES PATENT AND TRADEMARK OFFICE
CERTIFICATE OF CORRECTION

PATENT NO.        : 8,295,608 B2
APPLICATION NO.   : 12/745293
DATED             : October 23, 2012
INVENTOR(S)       : Yong-Soo Kim et al.

It is certified that error appears in the above-identified patent and that said Letters Patent is hereby corrected as shown below:

Column 9, Line 3, Claim 7, after "judgement" remove -- , --

Signed and Sealed this
First Day of January, 2013

David J. Kappos
*Director of the United States Patent and Trademark Office*